(12) United States Patent
Katic et al.

(10) Patent No.: US 9,444,588 B1
(45) Date of Patent: Sep. 13, 2016

(54) ON-CHIP BATHTUB BER MEASUREMENT FOR HIGH-SPEED SERDES DIAGNOSTICS

(71) Applicant: PMC-SIERRA US, INC., Sunnyvale, CA (US)

(72) Inventors: Ognjen Katic, Vancouver (CA); William D. Warner, Maple Ridge, CA (US)

(*) Notice: Subject to any disclaimer, the term of this patent is extended or adjusted under 35 U.S.C. 154(b) by 0 days.

(21) Appl. No.: 14/739,919

(22) Filed: Jun. 15, 2015

(51) Int. Cl.
*H04L 1/20* (2006.01)
*H04L 25/03* (2006.01)

(52) U.S. Cl.
CPC ......... *H04L 1/203* (2013.01); *H04L 25/03057* (2013.01)

(58) Field of Classification Search
CPC ............ H04L 2025/037; H04L 1/203; H04L 25/03057; H04B 1/123; H04B 17/11; G01R 31/3171
See application file for complete search history.

(56) References Cited

U.S. PATENT DOCUMENTS

| | | | |
|---|---|---|---|
| 7,246,274 B2 | 7/2007 | Kizer et al. | |
| 8,416,846 B1 * | 4/2013 | Lin | H04L 25/03057 375/229 |
| 8,855,179 B1 | 10/2014 | Saed | |
| 8,923,463 B1 | 12/2014 | Jenkins et al. | |
| 2010/0008414 A1 * | 1/2010 | Lee | H04L 25/0307 375/233 |

OTHER PUBLICATIONS

K.K. Parhi, "High-Speed architectures for algorithms with quantizer loops", IEEE International Symposium on Circuits and Systems, May 1990, pp. 2357-2360.

S. Kasturia, et al. "Techniques for High-Speed Implementations of Nonlinear Cancellation", IEEE Journal on Selected Areas in Communications, vol. 9, Issue No. 5, Jun. 1991, pp. 711-717.

* cited by examiner

*Primary Examiner* — Vineeta Panwalkar
(74) *Attorney, Agent, or Firm* — Dennis R. Haszko (57) ABSTRACT

A method for evaluating operation of a receiver comprising an analog front end, a plurality of samplers connected in parallel to the analog front end, the plurality of samplers comprising a plurality of utility samplers, a plurality of data samplers and a plurality of timing samplers, an unrolled decision feedback equalizer (UDFE) connected to outputs of the plurality of data samplers, and a serial input parallel out (SIPO) block connected to an output of the UDFE and outputs of the plurality of utility and timing samplers. The method comprises adjusting settings of the plurality of utility samplers to sweep across a range of interest, at each of a plurality of points comparing a selected output of one of the plurality of utility samplers at that point to an output of one of the plurality of data samplers to detect an error event, and, accumulating the error events.

19 Claims, 7 Drawing Sheets

ON-CHIP BATHTUB BER MEASUREMENT FOR HIGH-SPEED SERDES DIAGNOSTICS

TECHNICAL FIELD

The present disclosure relates to high-speed communication interfaces, and in particular to methods and systems for diagnostic and performance evaluation and control of serializer/deserializer (SERDES) blocks.

BACKGROUND

High-speed base-band transmission systems (5 Gbit/s or more) that are used in chip-to-chip, wire-line or fiber communications often include a serializer-deserializer (SERDES) block. A SERDES block converts bits carried over a parallel bus into a serial bit stream for transmission over the communication channel that can also include board traces, back-planes, connectors etc. On the receive side, the detected serial bits are converted back to the parallel stream.

The transmitter sends the data bits in one of a variety of different formats, such as for example nor-return-to-zero (NRZ) modulation or pulse amplitude modulation (PAM). Examples of SERDES applications can be found in different high-speed interface protocols such as PCI Express, SAS/SATA etc.

A variety of physical impairments limit the effective high-speed transmission of data signals, such as the frequency selective nature of the channels, which causes different frequency components of the input signal to be attenuated and phase-shifted differently. This causes the impulse response to span several symbol intervals, resulting in time-smearing and interference between successive transmitted input symbols, commonly known as intersymbol interference (ISI). The ISI resulting from the channel distortion, if left uncompensated, causes high error rates. The solution to the ISI problem is to design a receiver that employs a means for compensating or reducing the ISI in the received signal. The compensator for the ISI is called an equalizer and it is often included into the SERDES receiver design.

Two very popular equalizer structures used to mitigate the ISI are a linear equalizer (LE) and a decision feedback equalizer (DFE). In contrast to the maximum likelihood sequence estimation (MSLE), the data detection in LE and DFE is done on a symbol-by-symbol basis and hence it is much simpler to implement. However, the price is in the sub-optimality from a bit error rate (BER) perspective.

The equalizer implementation can be done in analog or digital circuitry, or combination of both techniques. The advantages of digital implementation are in design flexibility, but usually at the expense of more power requirements. The analog implementations are less power hungry and they can operate at faster clock rates.

When the final SERDES system is validated, it is assessed in terms of its tolerance to sinusoidal jitter (SJ) under various operating conditions. This is a characterization based on the BER of the received signal.

Improvements to methods and systems for measuring the signal and to provide insight in the impairments of the received and recovered signal are desired.

SUMMARY

One aspect of the invention provides a method for evaluating operation of a receiver comprising an analog front end for receiving a serial input signal and generating a pre-processed signal, a plurality of samplers connected in parallel to the analog front end for sampling the pre-processed signal, the plurality of samplers comprising a plurality of utility samplers, a plurality of data samplers and a plurality of timing samplers, an unrolled decision feedback equalizer (UDFE) connected to outputs of the plurality of data samplers, and a serial input parallel out (SIPO) block connected to an output of the UDFE and outputs of the plurality of utility samplers and the plurality of timing samplers for generating a parallel output signal. The method comprises adjusting settings of the plurality of utility samplers to sweep across a range of interest, at each of a plurality of points spanning the range of interest, comparing a selected output of one of the plurality of utility samplers at that point to an output of one of the plurality of data samplers to detect an error event, and, accumulating the error events for the plurality of points spanning the range of interest.

The method may comprise adjusting timing offsets of the plurality of utility samplers to sweep horizontally across the range of interest at a plurality of voltage threshold levels to determine a horizontal bathtub. The range of interest may span timing offsets across an entire signal unit interval. The horizontal sweep may start at a timing point of −0.5 UI with respect to a sampling point and move to the centre of the eye until a number of detected error events drops to zero, and then proceed to a timing point of +0.5 UI with respect to a sampling point and move to the centre of the eye until the number of detected error event drops to zero.

The method may comprise adjusting voltage thresholds of the plurality of utility samplers to sweep vertically across the range of interest to determine a vertical bathtub. The method may comprise adjusting the voltage thresholds from a maximum positive signal amplitude to zero and from a maximum negative signal amplitude to zero. The method may comprise adjusting the voltage thresholds from a median positive signal amplitude to zero, from the median positive signal amplitude up to a maximum positive amplitude, from a median negative signal amplitude to zero and from the median negative signal amplitude to a maximum negative signal amplitude. The method may comprise adjusting the voltage thresholds from a maximum positive signal amplitude downwardly until a number of detected error events drops to zero and from a maximum negative signal amplitude upwardly until the number of detected error events drops to zero. The method may comprise adjusting the voltage thresholds from a median positive signal amplitude downwardly until a number of detected error events drops to zero, from the median positive signal amplitude upwardly until the number of detected error events drops to zero, from a median negative signal amplitude downwardly until the number of detected error events drops to zero, and from the median negative signal amplitude upwardly until the number of detected error events drops to zero.

Another aspect of the invention provides a receiver comprising an analog front end for receiving a serial input signal and generating a pre-processed signal, a plurality of samplers connected in parallel to the analog front end for sampling the pre-processed signal, the plurality of samplers comprising a plurality of utility samplers, a plurality of data samplers and a plurality of timing samplers, an unrolled decision feedback equalizer (UDFE) connected to outputs of the plurality of data samplers, a serial input parallel out (SIPO) block connected to an output of the UDFE and outputs of the plurality of utility samplers and the plurality of timing samplers for generating a parallel output signal, and, a diagnostic circuit connected to the output of the UDFE and outputs of the plurality of utility samplers and connected to control the utility samplers. The diagnostic circuit controls the utility samplers to adjust settings of the plurality of utility samplers to sweep across a range of interest, at each of a plurality of points spanning the range of interest, compare a selected output of one of the plurality of utility samplers at that point to an output of one of the plurality of data samplers to detect an error event, and, accumulate the error events for the plurality of points spanning the range of interest. The number of utility samplers swept across the range of interest may be equal to the number of the plurality of data samplers.

Another aspect of the invention provides a method for controlling a receiver comprising an analog front end for receiving a serial input signal and generating a pre-processed signal, a plurality of samplers connected in parallel to the analog front end for sampling the pre-processed signal, the plurality of samplers comprising a plurality of utility samplers, a plurality of data samplers and a plurality of timing samplers, an unrolled decision feedback equalizer (UDFE) connected to outputs of the plurality of data samplers, and a serial input parallel out (SIPO) block connected to an output of the UDFE and outputs of the plurality of utility samplers and the plurality of timing samplers for generating a parallel output signal. The method comprises adjusting settings of the plurality of utility samplers to sweep timing offsets across a range of interest within a signal unit interval at a plurality of voltage levels, at each of a plurality of points spanning the range of interest, comparing a selected output of one of the plurality of utility samplers at that point to an output of one of the plurality of data samplers to detect an error event, determining a horizontal bathtub based on the error events for the plurality of points spanning the range of interest, and adjusting a timing offset of the data samplers from a midpoint of the signal unit interval based on the horizontal bathtub.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

The following describes methods and apparatus for measuring the vertical/horizontal eye opening in a signal on a communication device for a desired target bit error rate (BER) at the slicer input. Certain embodiments employ multiple utility samplers with programmable thresholds in order to reconstruct the eye within a receiver including an unrolled decision feedback equalizer (UDFE) at the sampler input of the UDFE in order to count the number of error bits and produce bathtub curves.

In some embodiments, the utility samplers are swept horizontally across the time/phase of a unit interval of a signal. The output of the samplers are compared against a data sampler (at the center of the eye) to obtain a horizontal bathtub graph of the bit error rate plotted over the unit interval. In some embodiments, the utility samplers are also swept across a voltage range for a particular span of a signal. The output of those samplers are also compared against a data sampler to obtain a vertical bathtub graph of bit error rate plotted against voltage. In some embodiments, vertical bathtub capture is swept across the time/phase of unit interval to obtain a full two-dimensional eye. In some embodiments, the horizontal bathtub graph is used to determine the optimal sampling input after a DFE.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Problem Statement and Introduction

SERDES blocks may be characterized by sinusoidal jitter (SJ) tolerance to provide a measure for timing tracking in the presence of frequency offset and various noise sources that add to deterministic and random jitter. However, such characterization does not provide detailed insight into the causes of possible low performance that results in low BER.

In order to obtain more detailed information about the quality of the receive chain, specialized measurement equipment is often used to capture bathtub curves and eye diagrams. The bathtub curve can be captured by sweeping the timing offset over one unit interval (UI) and determining the BER for each position. Then, it is called horizontal bathtub capture. Another type of bathtub may be obtained by sweeping a sampler voltage across the possible received signal levels at the symbol sampling time and counting the BER. This, so called vertical bathtub, shows the vertical eye opening at the symbol sampling time. A two-dimensional statistical eye may be created by doing vertical bathtub captures for different timing offsets in 1 UI, or doing horizontal bathtub captures for different slicer voltage levels. The statistical eye shows the system noise margins both in horizontal (timing offset) and vertical (signal amplitude) directions.

When the SERDES equipment is implemented in an ASIC (application specific integrated circuit), measurements can be done only at the input to the ASIC. As a result, any signal processing done within the ASIC to compensate the ISI, such as equalization using LE and/or DFE, is not reflected in the statistical eye capture. This means that the measurement does not truly represent the statistical eye at the sampler input. Furthermore, the measurements with the external equipment can be challenging to set-up and difficult to use.

It is therefore advantageous to perform these measurements inside the SERDES itself. This provides an accurate picture of the received signal at the slicer input. Embodiments of the present invention provide on-chip measurement systems for evaluating the impairments of a received signal in a SERDES that includes analog implementation of linear equalizer followed by the unrolled implementation of DFE. The following describes examples having a 3-tap LE with 2-tap UDFE, but those skilled in the art will appreciate that the methods and systems described herein may be applied using a different number of taps.

Figure 1:
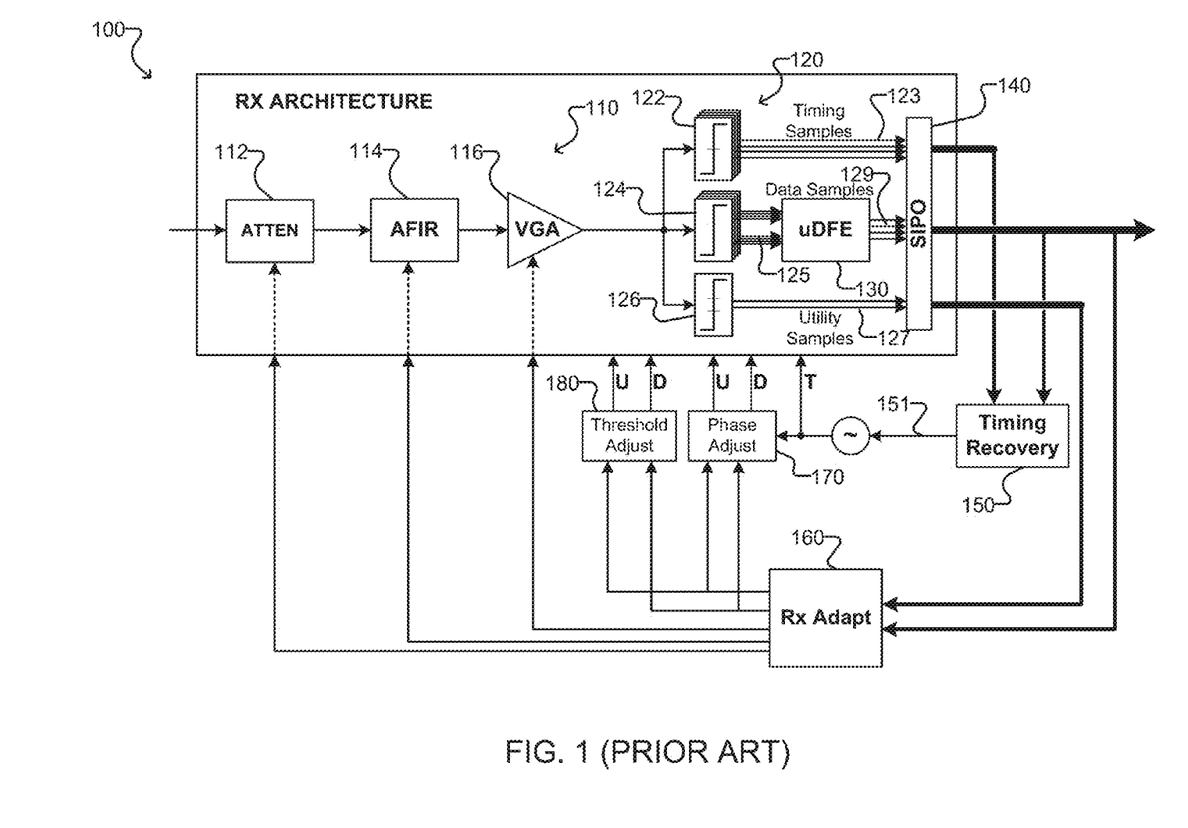
FIG. 1 is a schematic representation of an example SERDES system according to the prior art.

FIG. 1 shows an example SERDES system 100 according to the prior art. The SERDES system 100 has standard components to deal with signal attenuation and ISI distortion, including an analog front end 110 comprising an attenuator block 112, an analog finite impulse response (AFIR) filter 114, and a variable gain amplifier (VGA) 116, a plurality of samplers 120, a UDFE 130, and a serial input parallel output (SIPO) block 140.

The received signal passes through the initial attenuator block 112 that brings the nominal signal level into a range that is convenient for the operation of the AFIR filter 114. This range is determined by the amount of clipping that could be tolerated by AFIR filter 114. The AFIR filter 114 removes the dominant pre- and post-cursor ISI components. After the AFIR filter 114, the signal goes through the variable gain amplifier (VGA) and then reaches the samplers 120 and the UDFE 130.

The samplers 120, which may also be referred to as slicers, are of three types. Timing slicers 122 are provided at the eye edge to measure timing information to generate timing samples 123, data slicers 124 are used to generate data samples 125, and utility slicers 126 generate utility samples 127. The UDFE 130 outputs data decisions 129 based on the data samples 125. The data decisions 129 are output through the SIPO block 140 onto a data bus, and also provided to a timing recovery block 150 along with the timing samples 123. The utility samples 127 and data decisions 129 are provided to a receiver adaptation block 160 for adapting the analog front end 110 and thresholds of the UDFE 130.

The timing recovery block 150 provides a timing signal 151 for controlling the timing of the samplers 120. The timing of the timing slicers 122 is maintained substantially fixed based on the timing signal 151. The timing of the data and utility slicers 124 and 126 may be adjusted by a phase adjustment block 170 based on control signals from the receiver adaptation block 160. Thresholds of the data and utility slicers 124 and 126 may be adjusted by a threshold adjustment block 180 based on control signal from the receiver adaptation block 160.

In order to achieve high data rates, such as for example 28 Gbit/s, with low power consumption, all blocks of the SERDES system 100 are implemented in analog circuitry except the timing recovery block 150 and the receiver adaptation block 160. Those two blocks are implemented in digital circuitry in order to achieve flexibility and programmability.

Figure 2:
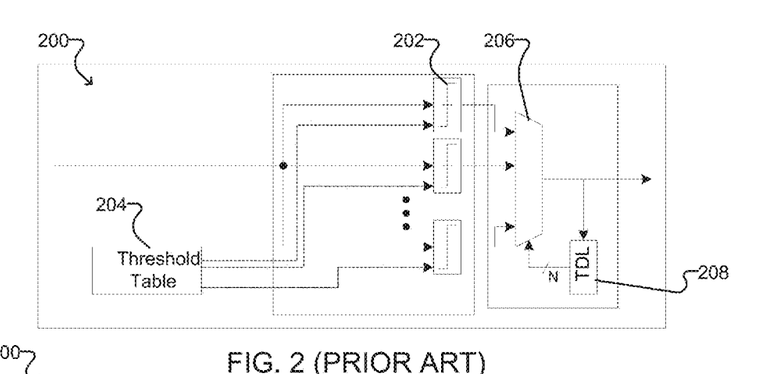
FIG. 2 is a schematic representation of an example unrolled DFE according to the prior art.

An unrolled DFE is just one implementation of the classical DFE that is used to deal with tight synthesis requirements of the electronic circuits. FIG. 2 is a simplified block diagram of an example UDFE 200 according to the prior art. Data slicers 202 have thresholds set by a threshold table 204, and the outputs of the data slicers 202 are provided to a multiplexer 206 connected to a time delay line (TDL) 208. A more detailed explanation of example unrolled DFEs may be found in S. Kasturia, et al. "Techniques for High-Speed Implementations of Nonlinear Cancellation", IEEE Journal on Selected Areas in Communications, vol. 9, No. 5, June 1991, pp. 711-717, which is hereby incorporated by reference herein.

The idea of this example UDFE implementation is to pre-compute all possible ISI offsets and apply them to the multiple decision devices (slicers). The number of slicers depend on the number of DFE taps (post-cursor ISI terms that we want to cancel). For a single tap DFE, there are two possibilities for the received signal to be +1 or −1, and hence the number of slicers is 2. For a two-tap DFE, there are 4 signal combinations and hence the number of slicers is 4. As can be seen, the number of slicers grows exponentially with the number of DFE taps. All slicer outputs are going to the multiplexer that chooses the final decision based on the previously detected bits. An advantage of this example implementation is that it can operate at very high frequencies, but at the expense of more circuitry and hence power.

In order to evaluate the SERDES system 100 performance without disturbing the data transmission, one of the utility slicers can be swept across 1 UI interval in order to measure BER for different timing positions in the eye and as a result obtain a horizontal bathtub curve. Likewise, a utility slicer can be swept across the voltage range to measure BER to obtain a vertical bathtub curve.

Figure 3:
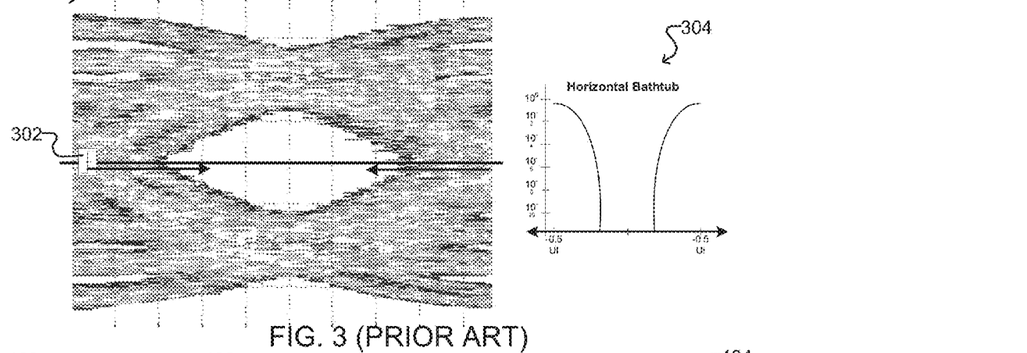
FIG. 3 shows an example of horizontal bathtub (HBT) generation according to the prior art.

FIG. 3 shows, on the left, a utility slicer 302 in voltage/UI space 300 with an example signal eye, and on the right, an example horizontal bathtub curve 304 showing BER in relation to the UI. The horizontal sweep starts with the slicer 302 having a voltage threshold of zero and a timing phase at the −0.5 UI point, and the timing phase is adjusted toward the center of the UI until the measured BER=0. After this, the timing phase of the slicer 302 is adjusted to +0.5 UI and swept back to the eye center until the measured BER=0.

Figure 4:
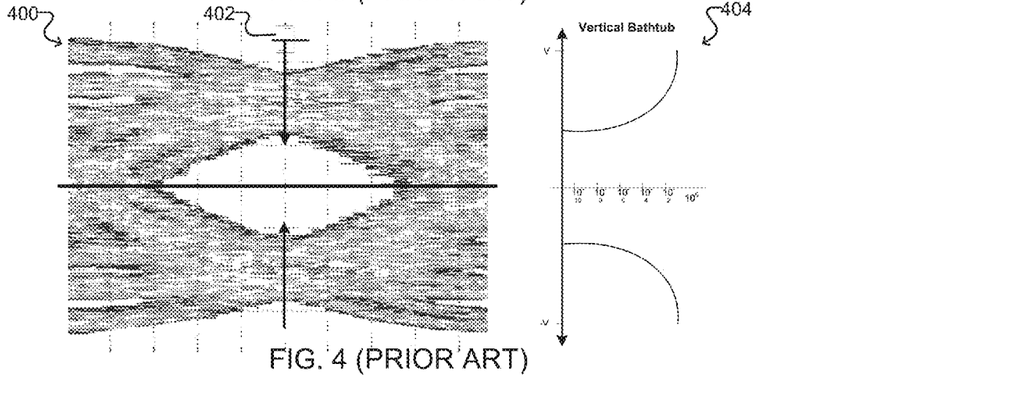
FIG. 4 shows an example of vertical bathtub (VBT) generation according to the prior art.

FIG. 4 shows, on the left, a utility slicer 402 in voltage/UI space 400 with an example signal eye, and on the right, an example vertical bathtub curve 404 showing BER in relation to the voltage range. The procedure for the vertical bathtub capture presented in FIG. 4 is very similar to the horizontal bathtub. The difference is that the voltage threshold utility slicer 402 is swept vertically starting from the maximum positive voltage down until the measured BER=0. After this, voltage threshold of the utility slicer 402 is adjusted to the maximum negative voltage and swept up until the measured BER=0. Vertical bathtub capture is done at the symbol timing point which is in the center of 1 UI interval.

A two-dimensional statistical eye may be obtained by sweeping the vertical bathtub capture across 1 UI, or by sweeping the horizontal bathtub capture across the voltage range. The prior art examples of bathtub capture shown in FIGS. 3 and 4 and discussed above employ one utility sampler from the SERDES and evaluate the performance without the UDFE. Accordingly, such techniques provide only limited information about BER, and do not account for signal corrections made by the UDFE.

Example Embodiments

Figure 5:
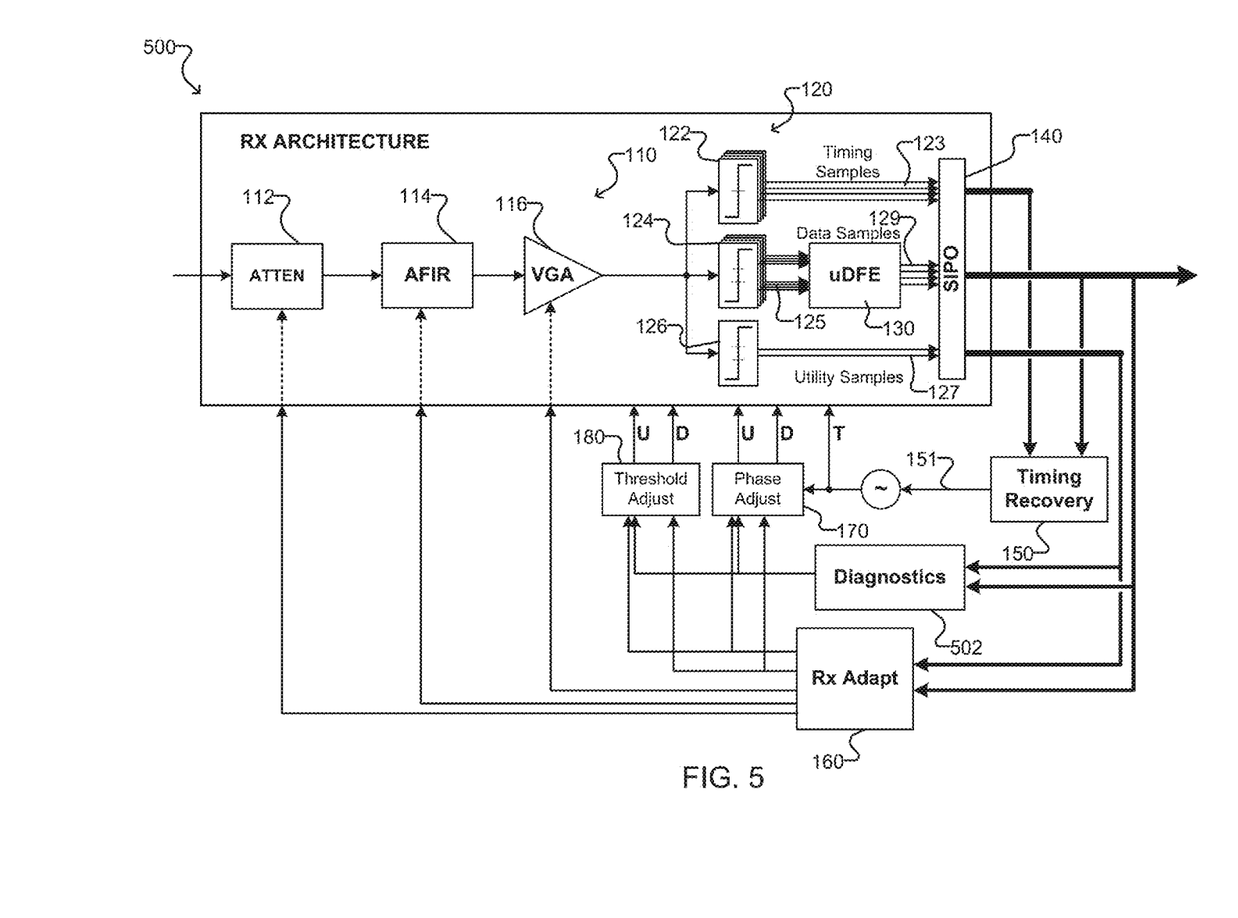
FIG. 5 is a schematic representation of an example SERDES system according to one embodiment.

FIG. 5 shows an example SERDES system 500 according to one embodiment of the current invention. SERDES system 500 is similar to system 100 of FIG. 1 described above, with an additional diagnostics block 502 that controls multiple utility samplers in order to reconstruct the signal corrected by the UDFE. As discussed further below, the system 500 may be used to generate bathtub curves that accurately show the overall system performance.

As shown in FIG. 5, the diagnostics block 502 shares the control of the utility samplers (though the phase and threshold adjustment blocks 170 and 180) with the receiver adaptation block 160. The diagnostics block 502 is capable of sweeping the voltage threshold and phase of multiple samplers and remove the post-cursor ISI from the received signal such that the measured BER accounts for ISI removal by the UDFE. The number of utility samplers used by the diagnostics block 502 matches the number of slicers used by the UDFE, and the diagnostics block 502 selects one of the samplers to use for measuring BER as discussed further below. In currently preferred embodiments, the equalizer is implemented as an unrolled DFE having 2 taps, such that there are 4 UDFE slicers. Those skilled in the art will appreciate that different number of taps (and thus slicers) can be used.

Figure 6:
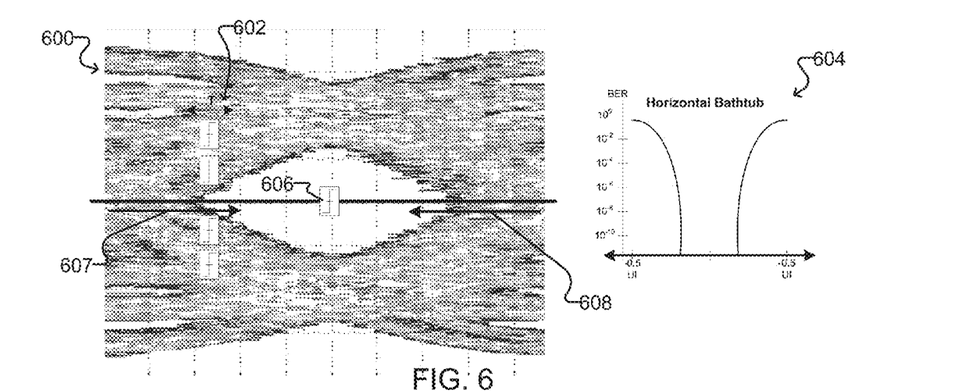
FIG. 6 shows an example of HBT generation according to one embodiment.
Figure 7:
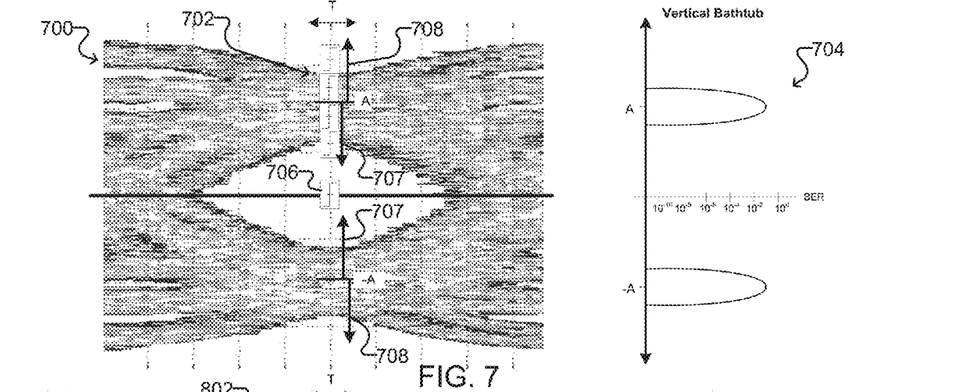
FIG. 7 shows an example of VBT generation according to one embodiment.
Figure 8:
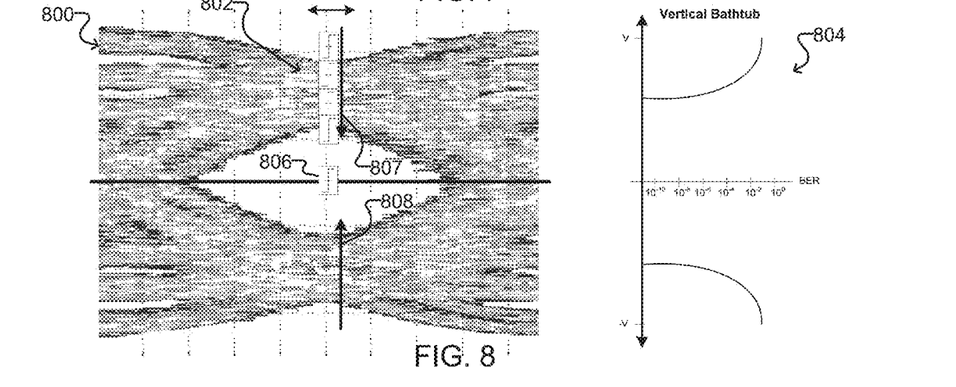
FIG. 8 shows an example of VBT generation according to another embodiment.

FIGS. 6 to 8 show examples of horizontal and vertical bathtub generation according to example embodiments of the present invention.

FIG. 6 shows, on the left, four utility slicers 602 in voltage/UI space 600 with an example signal eye, an on the right, an example horizontal bathtub curve 604 showing BER in relation to the UI. FIG. 6 also shows a data slicer 606 which represents the data slicer providing the output against which one of the utility slicer outputs is compared to detect an error event. The horizontal sweep starts with the slicers 602 having a timing phase at the −0.5 UI point, and the timing phase is adjusted toward the center of the UI until the measured BER=0, as indicated by arrow 607. After this, the timing phase of the slicers 602 is adjusted to +0.5 UI and swept back to the eye center until the measured BER=0, as indicated by arrow 608. The difference in the data sample and utility slicer outputs determines the transitions and hence the horizontal eye opening. The voltage thresholds for the utility slicers 602 are obtained from the adaptation block 160 and they are equal to the adapted thresholds used by the UDFE 130. In this way, the 4 utility slicers 602 are used to reconstruct the UDFE operation. In some situations, a "full" horizontal eye sweep may be conducted by incrementally adjusting the timing phase of the four utility slicers 602 from −0.5 UI to +0.5 UI with respect to the data sampling point. Such a full sweep would count zero errors in the area where the eye is open, and as such may require more time than sweeping inwardly from −0.5 UI and +0.5 UI until BER=0 as discussed above.

For each data bit $D_n$, previous data bits, such as for example $D_{n-2} D_{n-1}$, control which of the utility slicers 602 is used in the comparison and hence determine the error event. In some embodiments, those previous two bits can instead be $D_{n-3} D_{n-2}$ if the UDFE is configured to cancel the second and third post-cursor ISI components instead of the first and second. Those skilled in the art will appreciate that the configuration for cancelling the ISI terms can be made programmable.

The UDFE can be configured to operate in single tap DFE modes when only two data slicers are used. Then, one previous data bit (for example $D_{n-1}$ if the first post-cursor is targeted or $D_{n-2}$ if the dominant post-cursor is on the second term) is used to determine which utility slicer is used in the comparison.

FIG. 7 shows, on the left, four utility slicers 702 in voltage/UI space 700 with an example signal eye, and on the right, an example vertical bathtub curve 704 showing BER in relation to the voltage range. FIG. 7 also shows a data slicer 706 which represents the data slicer providing the output against which one of the utility slicer outputs is compared to detect an error event. The vertical sweep proceeds by incrementally adjusting the voltage thresholds of the utility slicers 702. The timing phase of the utility slicers 702 may be aligned with the data sampling point. Offsets in voltage thresholds for the utility slicers 702 are obtained by adding a constant value to four data slicer voltage thresholds determined by the adaptation block 160.

Generation of the vertical bathtub curve 704 starts at the median voltage level A determined by the adaptation block, and differs with respect what are the significant events for the inner/outer eye. In case of the inner eye, the difference between the current bit and the utility sampler output is counted, while for the outer eye the equality between the two is accumulated.

Similarly to horizontal bathtub generations the utility sampler used in the comparison is selected by $D_{n-2} D_{n-1}$, or by any other programmable bit pair depending on the target post-cursor ISI terms that are cancelled, for example $D_{n-3} D_{n-2}$, when the second and third post-cursors are removed, or by $D_{n-1}$ if the first post-cursor is targeted or $D_{n-2}$ if the UDFE is operated in a single tap mode.

In the FIG. 7 example, the eye is swept inwardly from the median positive and negative amplitudes A, −A, as indicated by arrows 707, and not from the maximum levels as presented in the prior art of FIG. 4. After the inward sweep, the eye is then swept outwardly from the median positive and negative amplitudes A, −A, as indicated by arrows 708. In this way, the behavior of both the inner and outer eye is reflected in the vertical bathtub curve 704. Also, the example vertical bathtub curve 704 shows more opening than the statistical eye at the UDFE input.

In some embodiments, if the median signal level is not known, the diagnostics block 502 controls a plurality of utility slicers to capture only the inner eye starting at the maximum positive and negative levels as presented in FIG. 8. FIG. 8 shows, on the left, four utility slicers 802 in voltage/UI space 800 with an example signal eye, and on the right, an example vertical bathtub curve 804 showing BER in relation to the voltage range. FIG. 8 also shows a data slicer 806 which represents the data slicer providing the output against which one of the utility slicer outputs is compared to detect an error event. Arrow 807 represents sweeping inwardly from the maximum positive level, and arrow 808 represents sweeping inwardly from the maximum negative level.

After capturing the vertical bathtub as in the FIG. 8 example, the BER data can be post-processed to obtain signal histograms by differencing the curves. The histogram will show the median amplitude level. The BER data can be further post-processed by integrating from the median amplitude to the inner and outer eye direction so that a representation of the vertical bathtub like the example of FIG. 7 can be obtained.

The diagnostics block 502 can use the same core structure for counting detected error events in both horizontal bathtub (HBT) and vertical bathtub (VBT) capture operations. The difference between counting errors in HBT and VBT capture is in how the signal passed to the counter is qualified.

Figure 9:
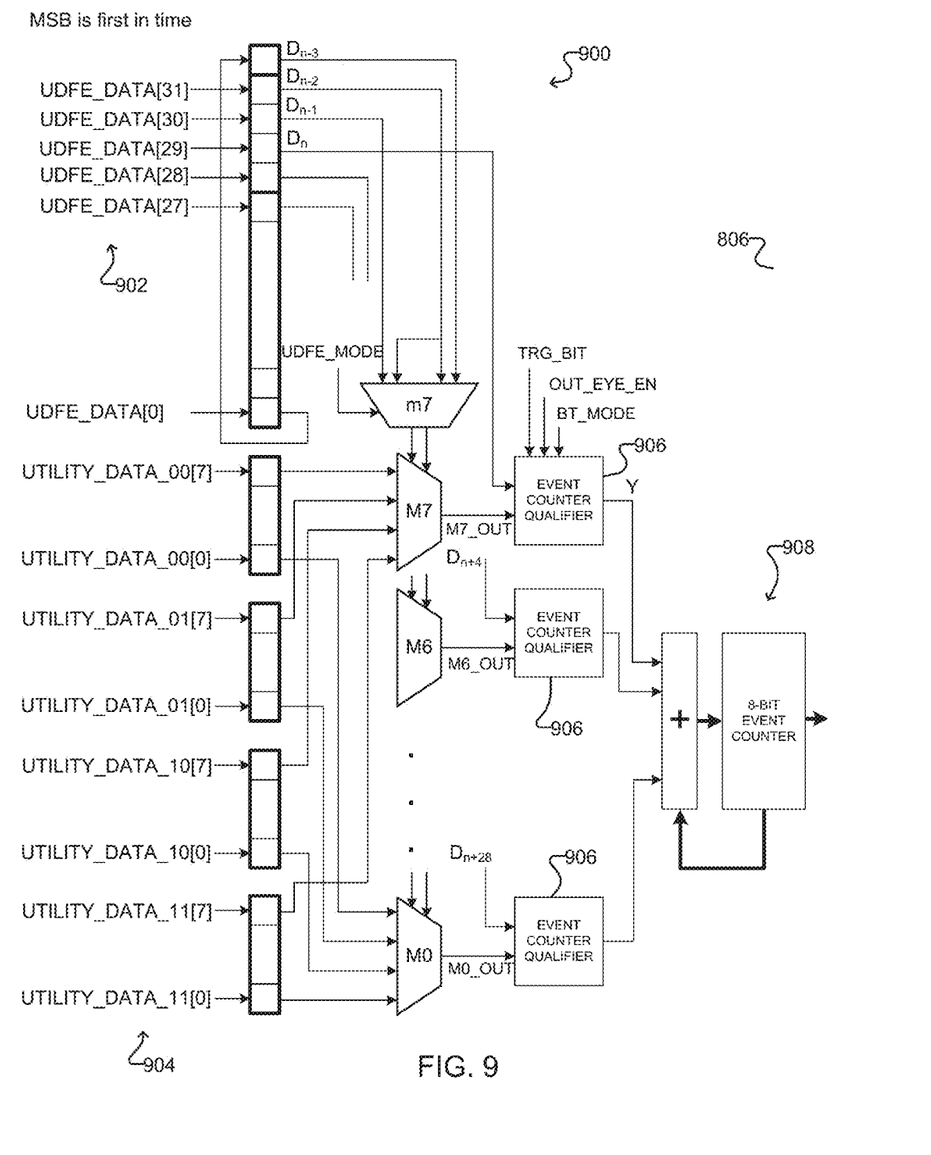
FIG. 9 shows an example logical structure for detecting error events according to one embodiment.
Figure 10:
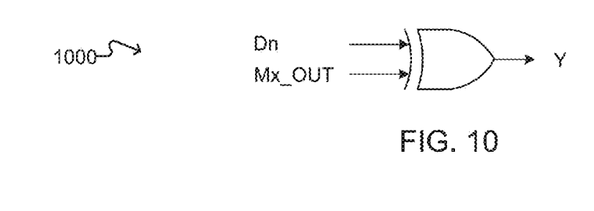
FIG. 10 shows a logical structure of an example event counter qualifier for HBT operation according to one embodiment.
Figure 11:
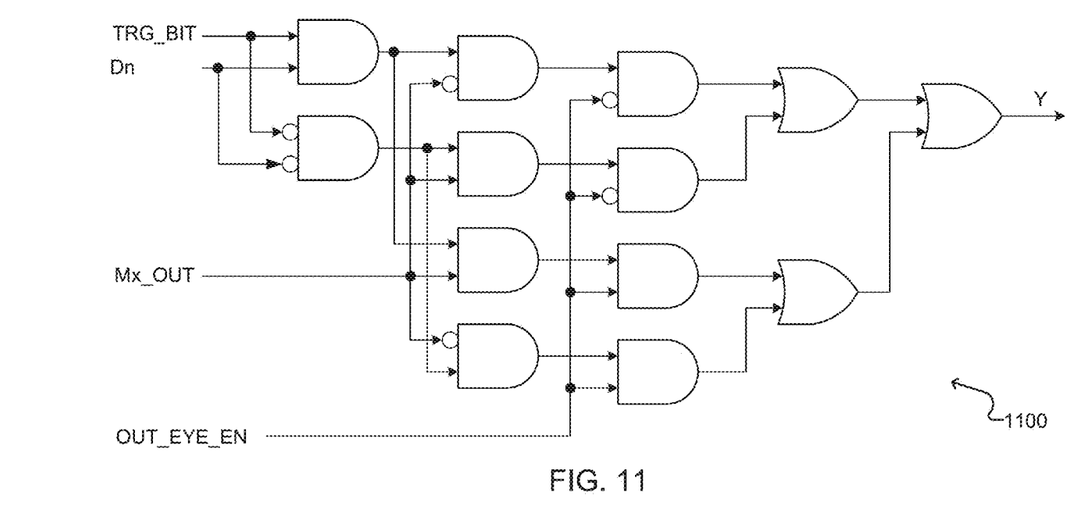
FIG. 11 shows a logical structure of an example event counter qualifier for VBT operation according to one embodiment.

Example implementations of logical structures for counting error events are shown in FIGS. 9 to 11.

FIG. 9 shows an example diagnostic circuit 900 which receives data bits 902 from the UDFE outputs and utility bits 904 from the utility samplers. In the implementation of FIG. 9, the processing is done in blocks of 32 bits at once. This is used just for illustration, and those skilled in the art recognize that other implementations are possible.

The data bits 902 are input from the UDFE_DATA[31:0] bus and are divided in 8 groups of 4 bits each. Within each group, the bit with the lowest index is the pre-cursor, while the bits with the two bits with the highest indices are the two-post cursor bits used for selection of the utility sampler output that is used in the error event generation.

The utility bits 904 are input from four UTILITY DATA busses, each 8 bits wide because of the previously described grouping of the data bits 902, and they carry the decisions coming from the utility samplers. Their outputs are sent to 8 multiplexers M0 . . . M7 that choose which of the four utility samplers is selected for the error event generation done by an event counter qualifier 906. In addition to a detected data bit and a selected utility bit from one of the multiplexers, each event counter qualifier 906 also receives a target bit signal TRG_BIT indicating if the target data bit is 1 or 0, a mode select signal BT_MODE indicating if HBT or VBT capture is being performed, and an eye signal OUT_EYE_EN indicating if the utility samplers in VBT capture are being swept across the outer or inner eye. The operation of each event counter qualifier is determined depending on the capture that is performed (HBT, VBT inner eye, VBT outer eye). The output Y of the event counter qualifier is sent to an error counter 908 The error events are accumulated to produce the number of errors in a pre-defined time window.

As described above, HBT capture looks for error events that represent differences in decisions between the outputs of a selected utility sampler and the UDFE. Hence, when in HBT mode, the event counter qualifier 906 may be implemented, for example as a simple XOR logic gate as shown in the example logical structure 1000 of FIG. 10.

FIG. 11 shows a logical structure 1100 of an example event counter qualifier for VBT operation. The logical structure 1100 receives 4 input signals: OUT_EYE_EN (parse outer or inner eye), TRG_BIT (target bit is 1 or 0), Dn (detected bit), and Mx_OUT (selected utility data decision). A logic table for the structure 1100 of FIG. 11 is shown in Table 1:

TABLE 1

Logic Table of VBT Event Counter Qualifier

| OUT_EYE_EN | TRG_BIT | Dn | Mx_OUT | Y |
|---|---|---|---|---|
| 0 | 0 | 0 | 0 | 0 |
| 0 | 0 | 0 | 1 | 1 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 1 |

As one of skill in the art will appreciate, the logical structures are shown in FIGS. 10 and 11 as implemented with conventional logic gates for ease of understanding, but in an actual implementation would typically be done at the transistor level using standard cell libraries. One of skill in the art will appreciate that various transistor implementations are possible for realizing conventional logic gates, as described for example in Weste & Harris, *CMOS VLSI Design: A Circuits and Systems Perspective*, (Pearson Education Inc. as Addison-Wesley, 2011), which is hereby incorporated by reference.

The methods and systems disclosed herein provide HBT and VBT information from an on-chip diagnostics block that more accurately reflects the behavior of the signal eye after UDFE corrections, without requiring external equipment. Such HBT and VBT information is useful in evaluating system performance and distortions in high-speed data transmission. Certain embodiments may thus enable adjustments in SERDES system operation to improve performance.

Figure 12:
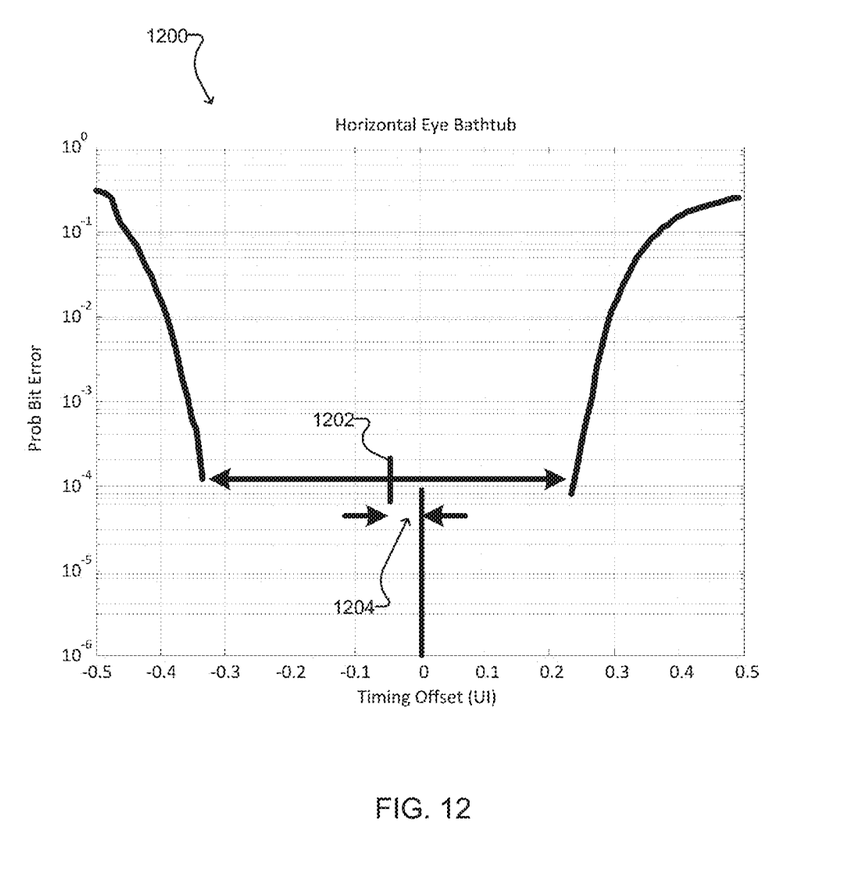
FIG. 12 shows an example of adjusting sampler timing offset based on HBT error data according to one embodiment.

Those skilled in the art know that larger values of DFE taps can produce horizontally asymmetrical eye. For example, FIG. 12 shows example HBT data 1200 where the eye is horizontally asymmetrical after correction by the UDFE. As such a midpoint 1202 of the horizontal eye is not aligned with the symbol timing point which is in the center of 1 UI interval. In some embodiments, the diagnostics block 502 is configured to apply a timing adjustment 1204 based on the generated HBT data to adjust the timing of all of the samplers 120, in order to achieve better SJ margin. The diagnostics block 502 may, for example provide a signal to the timing recovery block 150 to effect the timing adjustment determined based on the HBT data.

The systems and methods disclosed herein provide relatively low-cost solutions for evaluating system performances and distortions in a high-speed data transmission. Such evaluation is very important as with the trend of increasing data rates of SERDES designs, the impairments become more challenging to overcome, and systems and methods for observing such impairments become increasingly important.

The systems and methods disclosed herein provide for capturing bathtub curves by the on-chip diagnostics block, which is capable of reconstructing the eye at the decision slicer of the UDFE. In contrast to the cumbersome measurement with the external equipment, this approach provides a simple solution for measuring the eye and thus obtaining detailed information about the received signal quality.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method for evaluating operation of a receiver, the receiver including: an analog front end for receiving a serial input signal and generating a pre-processed signal; a plurality of samplers connected in parallel to the analog front end for sampling the pre-processed signal, the plurality of samplers comprising a plurality of utility samplers, a plurality of data samplers and a plurality of timing samplers; an unrolled decision feedback equalizer (UDFE) connected to outputs of the plurality of data samplers; and a serial input parallel out (SIPO) block connected to an output of the UDFE and outputs of the plurality of utility samplers and the plurality of timing samplers for generating a parallel output signal, the method comprising:
 adjusting settings of the plurality of utility samplers to sweep across a range of interest, where a number of utility samplers swept across the range of interest is equal to a number of the plurality of data samplers;
 at each of a plurality of points spanning the range of interest, comparing a selected output of one of the plurality of utility samplers at that point to an output of one of the plurality of data samplers to detect an error event; and,
 accumulating the error events for the plurality of points spanning the range of interest.

2. The method of claim 1 comprising adjusting timing offsets of the plurality of utility samplers to sweep horizontally across the range of interest at a plurality of voltage threshold levels to determine a horizontal bathtub.

3. The method of claim 2 wherein the range of interest spans timing offsets across an entire signal unit interval.

4. The method of claim 2 wherein the horizontal sweep starts at a timing point of −0.5 UI with respect to a sampling point and moves to the centre of the eye until a number of detected error events drops to zero, and then proceeds to a timing point of +0.5 UI with respect to a sampling point and moves to the centre of the eye until the number of detected error event drops to zero.

5. The method of claim 1 comprising adjusting voltage thresholds of the plurality of utility samplers to sweep vertically across the range of interest to determine a vertical bathtub.

6. The method of claim 5 comprising adjusting the voltage thresholds from a maximum positive signal amplitude to zero and from a maximum negative signal amplitude to zero.

7. The method of claim 5 comprising adjusting the voltage thresholds from a median positive signal amplitude to zero, from the median positive signal amplitude up to a maximum positive amplitude, from a median negative signal amplitude to zero and from the median negative signal amplitude to a maximum negative signal amplitude.

8. The method of claim 5 comprising adjusting the voltage thresholds from a maximum positive signal amplitude downwardly until a number of detected error events drops to zero and from a maximum negative signal amplitude upwardly until the number of detected error events drops to zero.

9. The method of claim 5 comprising adjusting the voltage thresholds from a median positive signal amplitude downwardly until a number of detected error events drops to zero, from the median positive signal amplitude upwardly until the number of detected error events drops to zero, from a median negative signal amplitude downwardly until the number of detected error events drops to zero, and from the median negative signal amplitude upwardly until the number of detected error events drops to zero.

10. A receiver comprising:
 an analog front end for receiving a serial input signal and generating a pre-processed signal;
 a plurality of samplers connected in parallel to the analog front end for sampling the pre-processed signal, the plurality of samplers comprising a plurality of utility samplers, a plurality of data samplers and a plurality of timing samplers;
 an unrolled decision feedback equalizer (UDFE) connected to outputs of the plurality of data samplers;
 a serial input parallel out (SIPO) block connected to an output of the UDFE and outputs of the plurality of utility samplers and the plurality of timing samplers for generating a parallel output signal; and,
 a diagnostic circuit connected to the output of the UDFE and outputs of the plurality of utility samplers and connected to control the utility samplers to:
 adjust settings of the plurality of utility samplers to sweep across a range of interest, where a number of utility samplers swept across the range of interest is equal to a number of the plurality of data samplers;
 at each of a plurality of points spanning the range of interest, compare a selected output of one of the plurality of utility samplers at that point to an output of one of the plurality of data samplers to detect an error event; and,
 accumulate the error events for the plurality of points spanning the range of interest.

11. The receiver of claim 10 wherein the diagnostic circuit adjusts timing offsets of the plurality of utility samplers to sweep horizontally across the range of interest at a plurality of voltage threshold levels to determine a horizontal bathtub.

12. The receiver of claim 11 wherein the range of interest spans timing offsets across an entire signal unit interval.

13. The receiver of claim 11 wherein the horizontal sweep starts at a timing point of −0.5 UI with respect to a sampling point and moves to the centre of the eye until a number of detected error events drops to zero, and then proceeds to a timing point of +0.5 UI with respect to a sampling point and moves to the centre of the eye until the number of detected error event drops to zero.

14. The receiver of claim 10 wherein the diagnostic circuit adjusts voltage thresholds of the plurality of utility samplers to sweep vertically across the range of interest to determine a vertical bathtub.

15. The receiver of claim 14 wherein the diagnostic circuit adjusts the voltage thresholds from a maximum positive signal amplitude to zero and from a maximum negative signal amplitude to zero.

16. The receiver of claim 14 wherein the diagnostic circuit adjusts the voltage thresholds from a median positive signal amplitude to zero, from the median positive signal amplitude up to a maximum positive amplitude, from a median negative signal amplitude to zero and from the median negative signal amplitude to a maximum negative signal amplitude.

17. The receiver of claim 14 wherein the diagnostic circuit adjusts the voltage thresholds from a maximum positive signal amplitude downwardly until a number of detected error events drops to zero and from a maximum negative signal amplitude upwardly until the number of detected error events drops to zero.

18. The receiver of claim 14 wherein the diagnostic circuit adjusts the voltage thresholds from a median positive signal amplitude downwardly until a number of detected error events drops to zero, from the median positive signal amplitude upwardly until the number of detected error events drops to zero, from a median negative signal amplitude downwardly until the number of detected error events drops to zero, and from the median negative signal amplitude upwardly until the number of detected error events drops to zero.

19. A method for controlling a receiver, the receiver including: an analog front end for receiving a serial input signal and generating a pre-processed signal; a plurality of samplers connected in parallel to the analog front end for sampling the pre-processed signal, the plurality of samplers comprising a plurality of utility samplers, a plurality of data samplers and a plurality of timing samplers; an unrolled decision feedback equalizer (UDFE) connected to outputs of the plurality of data samplers; and a serial input parallel out (SIPO) block connected to an output of the UDFE and outputs of the plurality of utility samplers and the plurality of timing samplers for generating a parallel output signal, the method comprising:

adjusting settings of the plurality of utility samplers to sweep timing offsets across a range of interest within a signal unit interval at a plurality of voltage levels;

at each of a plurality of points spanning the range of interest, comparing a selected output of one of the plurality of utility samplers at that point to an output of one of the plurality of data samplers to detect an error event;

determining a horizontal bathtub based on the error events for the plurality of points spanning the range of interest; and adjusting a timing offset of the data samplers from a midpoint of the signal unit interval based on the horizontal bathtub.

* * * * *

UNITED STATES PATENT AND TRADEMARK OFFICE
CERTIFICATE OF CORRECTION

| | | |
|---|---|---|
| PATENT NO. | : 9,444,588 B1 | Page 1 of 1 |
| APPLICATION NO. | : 14/739919 | |
| DATED | : September 13, 2016 | |
| INVENTOR(S) | : Ognjen Katic and William D. Warner | |

It is certified that error appears in the above-identified patent and that said Letters Patent is hereby corrected as shown below:

On the Title Page

Insert -- (73) Assignee: MICROSEMI STORAGE SOLUTIONS (U.S.), INC.
Aliso Viejo, CA (US) --

Signed and Sealed this
Twenty-eighth Day of March, 2017

Michelle K. Lee
*Director of the United States Patent and Trademark Office*